United States Patent
Alsalim et al.

(10) Patent No.: US 11,580,235 B2
(45) Date of Patent: Feb. 14, 2023

(54) METHOD AND SYSTEM FOR SECURING AND PROTECTING A STORAGE SYSTEM THAT INCLUDES A REMOVABLE STORAGE DEVICE

(71) Applicant: Saudi Arabian Oil Company, Dhahran (SA)

(72) Inventors: Ahmed Saad Alsalim, Dammam (SA); Ali Ahmad Alhussain, Safwa (SA)

(73) Assignee: Saudi Arabian Oil Company, Dhahran (SA)

( * ) Notice: Subject to any disclaimer, the term of this patent is extended or adjusted under 35 U.S.C. 154(b) by 522 days.

(21) Appl. No.: 16/732,685

(22) Filed: Jan. 2, 2020

(65) Prior Publication Data

US 2021/0209234 A1 Jul. 8, 2021

(51) Int. Cl.
G06F 21/60 (2013.01)
G06F 3/06 (2006.01)
G06F 21/62 (2013.01)
H04L 9/32 (2006.01)

(52) U.S. Cl.
CPC .......... *G06F 21/602* (2013.01); *G06F 3/0622* (2013.01); *G06F 3/0637* (2013.01); *G06F 3/0673* (2013.01); *G06F 21/6218* (2013.01); *H04L 9/3226* (2013.01)

(58) Field of Classification Search
CPC .... G06F 21/602; G06F 3/0622; G06F 3/0637; G06F 3/0673; G06F 21/6218; G06F 21/78; H04L 9/3226
See application file for complete search history.

(56) References Cited

U.S. PATENT DOCUMENTS

| | | | |
|---|---|---|---|
| 5,375,243 A | 12/1994 | Parzych et al. | |
| 6,012,146 A | 1/2000 | Liebenow | |
| 6,370,604 B1 * | 4/2002 | Sreekanti | G06F 13/4081 710/39 |
| 2004/0103246 A1 | 5/2004 | Chatterjee et al. | |

(Continued)

OTHER PUBLICATIONS

International Search Report and Written Opinion in corresponding PCT Application No. PCT/US2020/067271 dated Apr. 12, 2021.

*Primary Examiner* — Abiy Getachew
(74) *Attorney, Agent, or Firm* — Leason Ellis LLP

(57) ABSTRACT

A security solution having a system, a method, or a computer program for protecting contents in a target storage device that is arranged to be removable from a storage system having a unique combination of a system complex key (SCK) and a system identification (SID). The solution includes receiving a request to remove the target storage device from the storage system, where the storage system may have a plurality of storage devices each containing the identical combination of system complex key (SCK) and system identification (SID), and receiving a system complex key password (SCKP). The solution includes comparing the system complex key password (SCKP) to the system complex key (SCK) in the storage system, determining whether the system complex key password (SCKP) matches the system complex key (SCK) in the storage system, and suspending all read or write operations to the target storage device when the system complex key password (SCKP) matches the system complex key (SCK) in the storage system.

23 Claims, 5 Drawing Sheets

(56) References Cited

U.S. PATENT DOCUMENTS

| | | | |
|---|---|---|---|
| 2006/0059346 A1* | 3/2006 | Sherman | H04L 63/0823 |
| | | | 713/185 |
| 2007/0061879 A1 | 3/2007 | Dailey et al. | |
| 2014/0380453 A1* | 12/2014 | Alonso Cebrian | H04L 63/08 |
| | | | 726/5 |
| 2017/0177507 A1* | 6/2017 | Ren | G06F 12/1408 |

* cited by examiner

METHOD AND SYSTEM FOR SECURING AND PROTECTING A STORAGE SYSTEM THAT INCLUDES A REMOVABLE STORAGE DEVICE

FIELD OF THE DISCLOSURE

The present disclosure relates to a security solution that includes a system, method and computer program for securing and protecting a storage system that includes a removable storage device, including securing and protecting critical or confidential data hosted in the removable storage device.

SUMMARY OF THE DISCLOSURE

The disclosure provides a security solution, including a method, a system, and a computer program for securing and protecting a storage system that includes a removable storage device, including securing and protecting critical or confidential data hosted in the storage device.

According to a nonlimiting embodiment of the disclosure, a method is provided for protecting contents in a target storage device that is arranged to be removable from a storage system having a unique combination of a system complex key (SCK) and a system identification (SID). The method comprises receiving a request to remove the target storage device from the storage system, the storage system comprising a plurality of storage devices each containing the identical combination of system complex key (SCK) and system identification (SID), receiving a system complex key password (SCKP), comparing the system complex key password (SCKP) to the system complex key (SCK) in the storage system, determining whether the system complex key password (SCKP) matches the system complex key (SCK) in the storage system, and suspending all read or write operations to the target storage device when the system complex key password (SCKP) matches the system complex key (SCK) in the storage system.

The method can comprise receiving a release complex key password (RCKP) and unlocking the target storage device from the storage system when the release complex key password (RCKP) is determined to match a release complex key (RCK) for the target storage device.

The method can comprise redistributing data from the target storage device to one or more of the plurality of storage devices.

The method can comprise detecting a triggering event related to the target storage device.

The method can comprise generating an event notification based on the triggering event.

The method can comprise sending the event notification to a communicating device located a security operations center (SOC) or a storage administrator site.

The method can comprise maintaining all read or write operations to the target storage device when the system complex key password (SCKP) does not match the system complex key (SCK) in the storage system.

The method can comprise receiving a storage device in the storage system, establishing connectivity between the received storage device and the storage system, accessing a system complex key (SCKSD) and system identification (SIDSD) combination contained in the storage device, comparing the accessed system complex key (SCKSD) and system identification (SIDSD) combination to the combination of system complex key (SCK) and system identification (SID) for the storage system, and determining whether to format the received storage device or place the received storage device online.

The method can comprise placing the storage device online when the accessed system complex key (SCKSD) and system identification (SIDSD) combination contained in the received storage device matches the combination of system complex key (SCK) and system identification (SID) for the storage system.

The method can comprise formatting the storage device online when the accessed system complex key (SCKSD) and system identification (SIDSD) combination contained in the received storage device matches the combination of system complex key (SCK) and system identification (SID) for the storage system.

According to another nonlimiting embodiment of the disclosure, a system is provided for protecting contents in a target storage device that is arranged to be removable from a storage system having a unique combination of a system complex key (SCK) and a system identification (SID). The system can comprise a security appliance that is arranged to receive a request to remove the target storage device from the storage system, the storage system comprising a plurality of storage devices each containing the identical combination of system complex key (SCK) and system identification (SID). The security appliance can be arranged to receive a system complex key password (SCKP), compare the system complex key password (SCKP) to the system complex key (SCK) in the storage system, determine whether the system complex key password (SCKP) matches the system complex key (SCK) in the storage system, and suspend all read or write operations to the target storage device when the system complex key password (SCKP) matches the system complex key (SCK) in the storage system.

The system can comprise a system complex key generator arranged to generate said system complex key (SCK).

The system can comprise a release complex key generator arranged to generate a release complex key (RCK) for the target storage device, wherein the security appliance that is arranged to release the target storage device from the storage system when a release complex key password (RCKP) is provisioned that matches the release complex key (RCK) for the target storage device.

In the system, the security appliance can comprise a storage device configuration unit arranged to redistribute data from the target storage device to one or more of the plurality of storage devices in the storage system.

In the system, the security appliance can comprise an event notification generator that is arranged to detect a triggering event related to the target storage device. The event notification generator can be arranged to generate an event notification based on the triggering event.

In the system, the security appliance can be arranged to maintain all read or write operations to the target storage device when the system complex key password (SCKP) does not match the system complex key (SCK) in the storage system.

In the system, the security appliance can be included in the storage system, and the storage system can be arranged to receive a storage device, establish connectivity with the received storage device, access a system complex key (SCKSD) and system identification (SIDSD) combination contained in the storage device, compare the accessed system complex key (SCKSD) and system identification (SIDSD) combination to the combination of system complex key (SCK) and system identification (SID) for the storage system, and determine whether to format the received storage device or place the received storage device online.

According to another nonlimiting embodiment of the disclosure, a non-transitory computer readable storage medium is provided that stores computer program instructions that, when executed by a security appliance, protect a target storage device that is arranged to be removable from a storage system having a unique combination of a system complex key (SCK) and a system identification (SID). The computer program instructions can comprise the steps of: receiving a request to remove the target storage device from the storage system, the storage system comprising a plurality of storage devices each containing the identical combination of system complex key (SCK) and system identification (SID); receiving a system complex key password (SCKP); comparing the system complex key password (SCKP) to the system complex key (SCK) in the storage system; determining whether the system complex key password (SCKP) matches the system complex key (SCK) in the storage system; and suspending all read or write operations to the target storage device when the system complex key password (SCKP) matches the system complex key (SCK) in the storage system.

In the storage medium, the computer program instructions can comprise the steps of receiving a release complex key password (RCKP) and unlocking the target storage device from the storage system when the release complex key password (RCKP) is determined to match a release complex key (RCK) for the target storage device.

In the storage medium, the computer program instructions can comprise a step of redistributing data from the target storage device to one or more of the plurality of storage devices.

In the storage medium, the computer program instructions can comprise the steps of detecting a triggering event related to the target storage device, or generating an event notification based on the triggering event, or sending the event notification to a communicating device located a security operations center (SOC) or a storage administrator site.

In the storage medium, the computer program instructions can comprise a step of maintaining all read or write operations to the target storage device when the system complex key password (SCKP) does not match the system complex key (SCK) in the storage system.

In the storage medium, the computer program instructions can comprise the steps of receiving a storage device in the storage system, establishing connectivity between the received storage device and the storage system, accessing a system complex key (SCKSD) and system identification (SIDSD) combination contained in the storage device, comparing the accessed system complex key (SCKSD) and system identification (SIDSD) combination to the combination of system complex key (SCK) and system identification (SID) for the storage system, and determining whether to format the received storage device or place the received storage device online.

In the storage medium, the computer program instructions can comprise a step of placing the storage device online when the accessed system complex key (SCKSD) and system identification (SIDSD) combination contained in the received storage device matches the combination of system complex key (SCK) and system identification (SID) for the storage system.

Additional features, advantages, and embodiments of the disclosure may be set forth or apparent from consideration of the detailed description and drawings. Moreover, it is to be understood that the foregoing summary of the disclosure and the following detailed description and drawings provide non-limiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description explain the principles of the disclosure. No attempt is made to show structural details of the disclosure in more detail than may be necessary for a fundamental understanding of the disclosure and the various ways in which it may be practiced.

Figure 1:
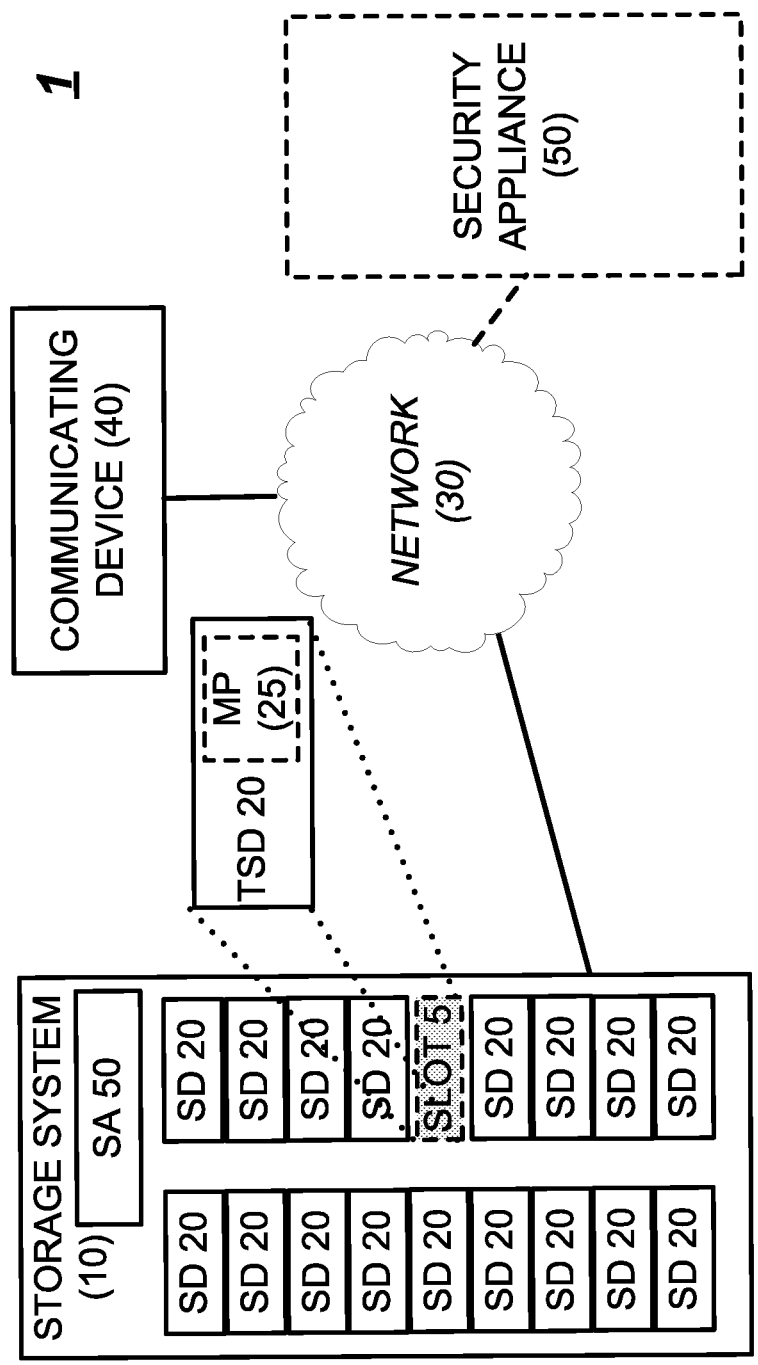
FIG. 1 shows a user environment provided with a security solution, constructed according to the principles of the disclosure.

The present disclosure is further described in the detailed description that follows.

DETAILED DESCRIPTION OF THE DISCLOSURE

The disclosure and its various features and advantageous details are explained more fully with reference to the non-limiting embodiments and examples that are described or illustrated in the accompanying drawings and detailed in the following description. It should be noted that features illustrated in the drawings are not necessarily drawn to scale, and features of one embodiment can be employed with other embodiments as those skilled in the art would recognize, even if not explicitly stated. Descriptions of well-known components and processing techniques can be omitted so as to not unnecessarily obscure the embodiments of the disclosure. The examples used are intended merely to facilitate an understanding of ways in which the disclosure can be practiced and to further enable those skilled in the art to practice the embodiments of the disclosure. Accordingly, the examples and embodiments should not be construed as limiting the scope of the disclosure. Moreover, it is noted that like reference numerals represent similar parts throughout the several views of the drawings.

Enterprise information systems invariably host a large cache of mission-critical and important archival data. Ensuring the security of such data has led to the development of several storage solutions and arrangements that maintain high availability and distribute data amongst remaining computer resources when a computer resource failure occurs. Such arrangements can include, for example, RAID configurations of multiple hard drives, hybrid RAID configurations, or nonstandard RAID configurations such as, for example, Linux MD RAID, Hadoop, or BeeGFS. RAID, which alternatively stands for Redundant Array of Inexpensive Disks (or Drives) or Redundant Array of Independent Disks, refers to a data storage virtualization technology that combines multiple physical disk drives into one or more logical units to ensure data redundancy, while distributing data across the multiple storage devices according to one of several arrangements called RAID levels, the RAID levels being dictated by the required level of redundancy and performance.

Existing storage device replacement methodologies allow any person to remove or insert new or used storage devices in storage systems that can contain critical confidential data of other users. This can be especially problematic where non-enterprise employees, such as, for example, hardware engineers, have access to enterprise storage systems and are responsible for replacing failed storage devices in storage systems they manage. Such non-enterprise users may have access to an entire datacenter and can remove any storage device from other storage systems which they may not be authorized to handle.

Frequently, storage vendors format storage devices automatically once they are inserted into a storage system. So, if a hardware engineer removes two or more storage devices by mistake, then critical data can be corrupted as the storage system will not be able to recover the missing data.

While being a powerful data storage security solution, RAID has some drawbacks that are inherent in the physical implementation of the technology. The fact that a RAID infrastructure is made up of cooperating groups of individual physical storage devices introduces potential vulnerabilities of the type that are common to any single storage device in operation. Storage devices, such as, for example, hard drives, can be accidentally or intentionally removed while data is in transit during read/write operations, resulting in data corruption. Unauthorized individuals can abscond with enterprise storage devices and attempt to mount them in an unauthorized storage system, leading to a potentially massive data breach that can result in a loss of competitive position, lost assets and loss in market value. Third-party data storage vendors may re-task storage devices that hosted a former client's data, leading to a situation wherein the former client's data is commingled with and possibly accessible to one or more of the vendor's current clients. Furthermore, while data-at-rest encryption may be available, it tends to be an imperfect remedy for some of these ills. Encryption also has undesirable side-effects such as high overhead and resultant network latency that can prevent its widespread implementation in certain enterprises. As such, there exists an urgent unmet need for a security solution that can ensure data security in a storage system, such as a RAID system or other arrangement that utilizes storage devices, such as, for example, hard drives. Such a security solution is provided by the present disclosure.

A security solution is provided for securing and protecting a storage system that includes one or more removable storage devices, and for securing and protecting data that is hosted in the storage devices. The security solution can secure and protect enterprise critical data that is hosted in a storage device such as, for example, a hard drive. The security solution can ensure protection of data stored in the removable storage devices from untoward events such as, for example, data corruption caused by improper or unauthorized storage device dismount procedures, inadvertent cross-party data sharing caused by storage device reuse among multiple entities without intervening formatting of the storage device, or deliberate expropriation of the storage device with the intention of mounting the storage device in an unauthorized storage system and pilfering data stored in the storage device.

Implementation of an embodiment of the security solution can begin with the inception of a storage system that includes one or more removable storage devices, such as, for example, removable hard drive storage media. The security solution can include a combination of at least two complex keys—a system complex key (SCK) and a release complex key (RCK)—for authorized personnel to safely insert and remove one or more storage devices without corrupting or losing hosted data. During an initial configuration of the storage system, a system complex key (SCK) can be generated by a system complex key generator using, for example, a symmetric-key algorithm or a public-key algorithm. The SCK can be stored in the storage system.

The security solution can also include a system storage identification (SID). The SID can be stored together with the SCK in each storage device, so that if a storage device is removed from the storage system and reinserted in the same storage system, the contents of the reinserted storage device are automatically accessible once the SCK-SID combination in the reinserted storage device is matched to the SCK-SID combination for the storage system. During initial configuration of the storage system, the SID can be determined for the storage system and saved in the storage system, as well as each storage device in the storage system.

The SID can include, for example, a serial number, a media access control (MAC) address, or any unique identifier for the storage system. For instance, the SID can include the serial number or MAC address of RAID system. The SID can be stored together, in combination, with the SCK, in each individual storage device in the storage system, or each individual storage device to be added to the storage system. The SCK can be required of any user attempting to suspend or terminate read/write operations to avoid data loss or corruption during a storage device removal from the storage system.

The release complex key (RCK) can be generated by a release complex key generator running, for example, a symmetric-key algorithm or a public-key algorithm. The RCK can be stored in the storage system and/or each removable storage device in the storage system. The RCK can be combined with the SID and/or SCK and encoded or stored in each storage device.

The security solution can impose requirements upon users, including administrators or hardware engineers, before allowing a user to access, install or remove a storage device from the storage system. For example, before a storage device can be removed from a storage system, the security solution can require that all read and write operations to the storage device be suspended or terminated, and data hosted therein be redistributed to other storage devices in the same storage system, thereby allowing for safe removal of the storage device and avoiding corruption or loss of data in the storage device. In this regard, the security solution can require provisioning of an SCK password (or SCKP) that matches the SCK stored in the storage device targeted for removal. The security solution can execute logic that compares the provisioned SCKP with the stored SCK, and, if they match, read/write operations can be suspended. If they don't match, then the storage device cannot be removed without corrupting the data in the storage device.

The security solution can be configured to count the number of incorrectly entered SCKPs. The security solution can be configured to allow entry of an incorrect SCKP a predetermined number of times before the storage device formats itself, irretrievably wiping its contents so that data that was stored on the storage device becomes inaccessible.

After read/write operations to the storage device are suspended, the security solution can require entry of a release complex key password (RCKP) to unlock the storage device and allow access to data stored in the device. Upon entry of the correct RCKP associated with the target storage device, the device can be unlocked and the hosted data can be accessed. If an incorrect RCKP password is provisioned, then the storage device contents will remain locked and inaccessible. As with entry of the SCKP, the security solution can be configured to count the number of incorrectly entered RCKPs. If failed attempts to enter the RCKP exceed a predetermined number of attempts, the storage device can be triggered to execute a formatting operation to forestall any possible unauthorized access to the data hosted in the device.

The security solution can include generation or transmission of an event notification. The event notification can be rendered locally or transmitted to a communicating device. The communicating device can be located, for example, at an administrator site. The event notification can include, for example, an email message, a text message, an audio message, a video message, or any other type of alert that can be manifested or reproduced by a communicating device, such as, for example, to indicate a repeat login failure event, tampering with a storage device, or any other event that could render contents in a storage device vulnerable to unauthorized access, thereby allowing for immediate remedial action by the communicating device or its user.

In a nonlimiting embodiment of the security solution, after a storage device has been physically mated to a target storage system, the storage device can issue a request demanding that an SCKP be provisioned as a first, necessary but not sufficient condition for mounting (or insertion) of and access to the contents of the storage device. The target storage system can reply with an SCKP with which the target storage system has been configured or that has been entered into the target storage system, for example, by a system administrator or other user via an input/output interface. If the provisioned SCKP is determined to match the SCK for the storage system, a read/write connection can be permitted to be established and access to the storage device enabled. If the provisioned SCKP is determined not to match an SCK encoded or stored in the storage device, then the target storage system can be directed to issue a request for the correct SCKP. If the SCKP provided subsequently is correct, evidencing authorization to access of the storage device in question, the target storage system can be configured to modify or update the SCK stored or encoded in the storage device to correspond to that with which the target storage system has been configured. A notification message can be generated or transmitting to the communicating device, for example, at administrator site, indicating the occurrence of this event.

As an additional layer of security for the storage device, if neither the read/write connection nor the SCK reassignment is accomplished, the storage device can format itself, erasing any data stored thereon. A notification message can be generated or transmitted the communicating device, indicating the occurrence of this event.

In a nonlimiting embodiment of the security solution, a user, such as, for example, an authorized storage administrator, can execute a command to remove a selected storage device from a storage system. The command can cause all read or write (I/O ops) to the target storage device to be suspended or terminated. The same or another user, such as, for example, a hardware engineer, can provide an RSKP to unlock the storage device from the storage system. If the previous steps are done successfully, the target storage device can be unlocked and the user can safely remove the storage device from the storage system, without data corruption.

In the same nonlimiting embodiment, the target storage device or another storage device can be safely inserted in the same storage system. To safely insert the storage device: an SCKP can be entered that matches the SCK kept in the storage device; a command can be executed to reutilize the storage device; and, if both steps are completed successfully, the storage device can be reutilized with the same data available in the device. Hence, production systems or applications can be prevented from corrupting data in the storage device if the storage device is removed by mistake. However, if both steps are not completed successfully, the storage system can format the inserted storage device and use the device as a new storage device. Hence, the security solution can secure and protect critical and confidential data on physical storage devices.

In a nonlimiting application, the security solution can prevent critical data hosted on enterprise storage devices from being destroyed or corrupted as a result of multiple storage devices being removed from the storage system, such as, for example, from the same RAID group or disk shelf. The security solution can configure each new storage system with a respective unique SCK and SID combination. For each storage system, its unique SCK-SID combination can be kept automatically on all storage devices in the storage system. In order to remove a storage device from the storage system, an SCKP can be provided that matches the SCK for the storage system, and, if a match is determined, read/write operations can be suspended to the targeted storage device and the data redistributed among other storage devices within the same storage system. However, if an incorrect SCKP is provided more than a permitted maximum number of times, an event notification can be generated and sent to a communicating device, which can be located at a storage administrator site, a security analyst site, or a security operations center (SOC). If the storage device is still removed from the storage system after the SCKP is incorrectly entered more than the permitted maximum number of times, the storage device can be automatically sanitized (formatted), thereby rendering its contents inaccessible or unusable.

In a nonlimiting application that includes installation of a new storage system or reutilization of an existing system that has been sanitized, the security solution can, during initial configuration, generate an SCK for the storage system, and generate a combination key comprising the SCK and the SID (for example, serial number of storage hardware), which will be kept automatically in all storage devices inserted in the storage system during the initial setup and configuration. The security solution can generate an RSK that can be used later to suspend all read/write operations to\from a storage device targeted for removal from the storage system. To safely remove an online or production storage device from the storage system, without data corruption or application interruption, the security solution can include: receiving a command (for example, from a storage administrator) to suspend read/write operations to the targeted storage device as a pre-step to remove the selected storage device; requesting provisioning of an SCKP for the storage system device; receiving the SCKP; comparing the SCKP to the SCK for the storage system; and, if a match is determined, suspending or terminating read/write operations to the target storage device. The security solution can further include requesting provisioning of an RCKP, receiving the RCKP and comparing the RCKP to the RCK for the storage system and, if a match is determined, unlocking the targeted storage device so that it can be removed from the storage system. If a determination is made that the SCKP or RCKP does not match the SCK or RCK, respectively, for the storage system, then the targeted storage device can remain locked in the storage system and read/write operations can remain ongoing, and an event notification can be generated and sent to a communicating device, such as, for example, in an SOC. Resultantly, a storage administrator, monitoring team, or datacenter security guard can be alerted to investigate the event.

In another nonlimiting application that includes safely inserting a production storage device hosting critical or confidential data without losing or wiping its data, the security solution can include: after the storage device is inserted in the storage system, checking storage device information including the SCK-SID combination kept in the storage device; determining whether the SCK-SID combination matches the SCK-SID combination for the storage system; and, if the SCK-SID combination stored or encoded I the storage devices matches the SCK-SID combination for the storage device, placing the storage device online and making its contents accessible in the storage system. However, if either the SCK or SID does not match, then a request can be generated, requiring provisioning of an SCKP that matches the SCK that is stored or encoded in the storage device. If the correct SCKP is provisioned, which matches the SCK in the storage device, then the SCK-SID combination kept in the storage device can be modified automatically to match the SCK-SID combination for the storage system. If an incorrect SCKP is provisioned more than a predetermined maximum number of times, the storage system (or the storage device itself) can automatically format/wipe the contents in the storage device and configure the storage device as a new storage device in the storage system. This way, confidential data will be kept safe and utilized only by the authorized persons.

FIG. 1 shows an example of a user environment 1 that is provided with the security solution, according to the principles of the disclosure. The user environment 1 can include, for example, a datacenter. The environment 1 includes a storage system 10 having one or more removable storage devices (SD) 20. The storage system 10 can include a security appliance (SA) 50. The SA 50 can be provided separate from the storage system 10 (as shown in FIG. 1 in broken lines). The storage system 10 can include a RAID configuration with multiple hard drives, a hybrid RAID configuration, a nonstandard RAID configuration, such as, for example, Linux MD RAID, Hadoop, or BeeGFS, or any other storage system comprising multiple storage devices. The storage system 10 can include a backbone (not shown). The storage system 10 can be arranged, for example, according to the Common RAID Disk Drive Format (DDF) standard.

Each SD 20 can be installable in a respective slot 5 in the storage system 10. Each SD 20 can be lockable in the storage system 10 to prevent unauthorized removal of the device from its respective slot 5. Each SD 20 can include a microprocessor (MP) 25. The MP 25 can include a computing device. The MP 25 can include a computer-readable medium that can hold executable or interpretable computer program code or instructions that, when executed by the MP 25, causes the steps, processes or methods associated with a target storage device (TSD) 20 to be carried out. FIG. 1 shows a nonlimiting example where the TSD 20 is removed from the storage system 10, thereby exposing a receiver slot 5. The TSD 20 can be the same as (or different from) all other SDs 20 in the storage system 10. The TSD 20 can be unlocked and removed from the storage system 10 and replaced with another storage device (not shown).

The environment 1 can include a network 30 and a communicating device 40.

The network 30 can include a backbone (not shown). The communicating device 40 can be located, for example, at an administrator site, in a security operations center (SOC) or any other location internal or external to the network 30.

Figure 2:
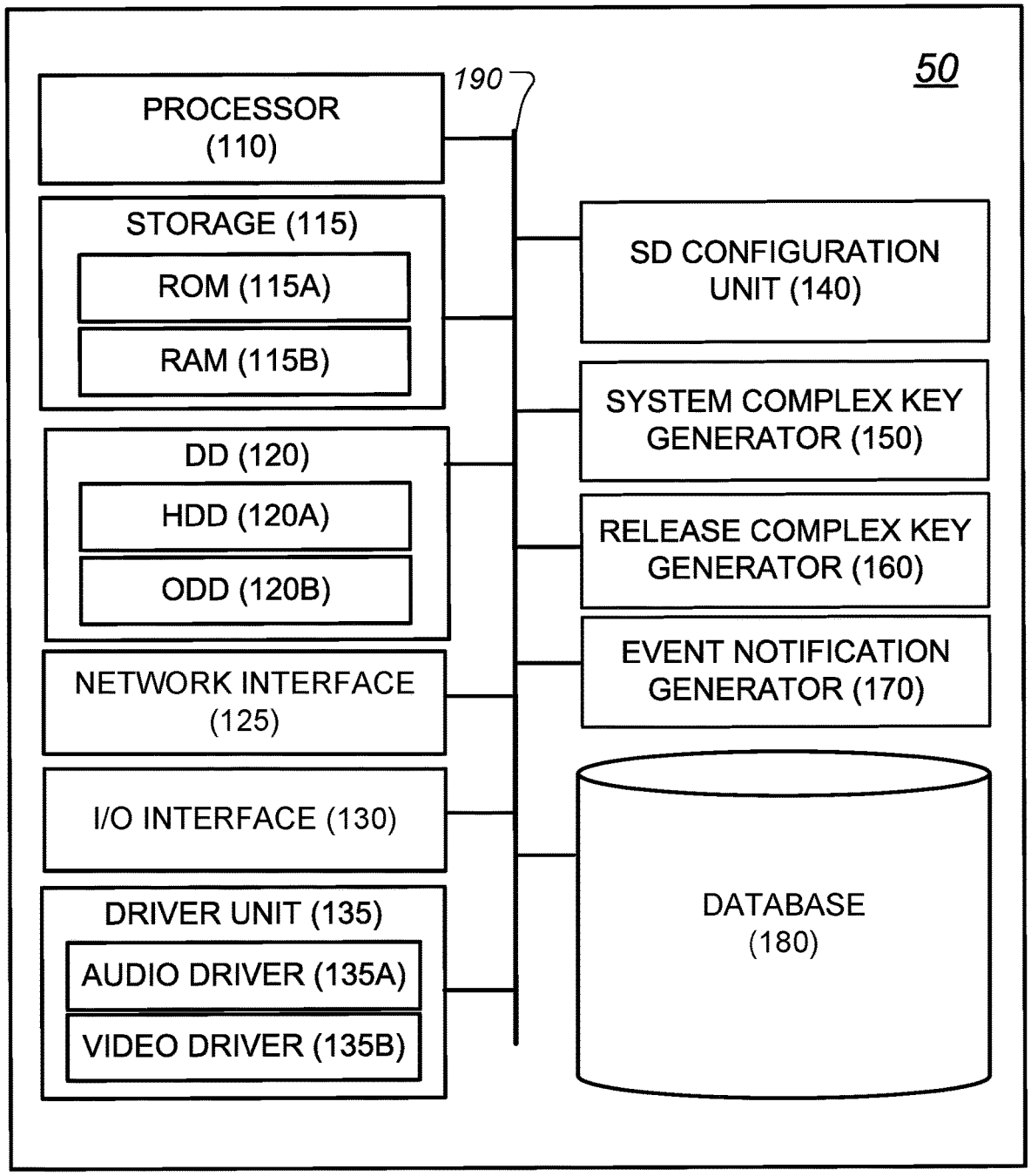
FIG. 2 shows a nonlimiting example of a security appliance constructed according to the principles of the disclosure.

FIG. 2 shows a nonlimiting embodiment of the security appliance 50, arranged according to the principles of the disclosure. The security appliance 50 can include a processor 110, a storage 115, a disk drive (DD) 120, a network interface 125, an input/output (I/O) interface 130, or a driver unit 135. The security appliance 50 can include a storage device (SD) configuration unit 140. The security appliance 50 can include a system complex key generator 150. The security appliance 50 can include a second complex key generator 160. The security appliance 50 can include an event notification generator 170. The security appliance 50 can include a database 180. The security appliance 50 can include a backbone 190, which can be connected to any one or more of the components 110 to 180. Any one or more of the components 115 to 180 can include a device or a module that is separate from the processor 110, as seen in FIG. 2, or integrated or integrateable in a device(s) such as the processor 110.

The security appliance 50 can include a sound generation device (not shown), such as, for example, a speaker, a sound pickup device (not shown), such as, for example, a microphone, or a display device (not shown), such as, for example, a light emitting diode (LED) display or a liquid crystal display (LCD). The security appliance 50 can include a voice command device (not shown), a smart voice recognition (not shown) or a voice activated device (not shown).

The security appliance 50 can be implemented as one or more computer resources, which can include a machine learning platform, such as, for example, an artificial neural network (ANN), a convolutional neural network (CNN), a deep CNN (DCNN), an RCNN, a Mask-RCNN, a deep convolutional encoder-decoder (DCED), a recurrent neural network (RNN), a neural Turing machine (NTM), a differential neural computer (DNC), a support vector machine (SVM), a deep learning neural network (DLNN), Naive Bayes, decision trees, linear regression, Q-learning, temporal difference (TD), deep adversarial networks, fuzzy logic, or any other machine intelligence platform capable of supervised learning.

The backbone 190 can include a bus or any of several types of bus structures that can further interconnect to a memory bus (with or without a memory controller), a peripheral bus, and a local bus using any of a variety of commercially available bus architectures.

The processor 110 can include any of various commercially available central processing unit (CPU) or graphic processing unit (GPU) devices. Dual microprocessors and other multi-processor architectures can be included in the processor 110. The processor 110 can include a general-purpose GPU (GPGPU), a field programmable gate array (FGPA), an application-specific integrated circuit (ASIC), or a manycore processor. The processor 110 includes a computing device.

The security appliance 50 can include a computer-readable medium that can hold executable or interpretable computer program code or instructions that, when executed by the processor 110 or one or more of the other components (e.g., devices or modules) in the security appliance 50, causes the steps, processes or methods in this disclosure to be carried out, as well as steps, process or methods contemplated by this disclosure. The computer-readable medium can be included in the storage 115 or DD 120.

The storage 115 can include a read only memory (ROM) 115A and a random-access memory (RAM) 115B. A basic input/output system (BIOS) can be stored in the non-volatile memory 115A, which can include, for example, a ROM, an EPROM, or an EEPROM. The BIOS can contain the basic routines that help to transfer information between components in the security appliance 50, such as during start-up. The RAM 115B can include a high-speed RAM such as static RAM for caching data.

The DD 120 can include a hard disk drive (HDD) 120A and an optical disk drive (ODD) 120B. The HDD 120A can include, for example, an enhanced integrated drive electronics (EIDE) drive, or a serial advanced technology attachments (SATA) drive. The ODD 120B can include, for example, a read/write from/to a CD-ROM disk (not shown), or, read from or write to other high capacity optical media such as a digital versatile disc (DVD). The HDD 120A or ODD 120B can be configured for external use in a suitable chassis (not shown). The DD 120 can be connected to the backbone 190 by a hard disk drive interface (not shown) and an optical drive interface (not shown), respectively. The hard disk drive interface (not shown) can include a Universal Serial Bus (USB) (not shown), an IEEE 1394 interface (not shown), and the like, for external applications.

The storage 115 or DD 120, including computer-readable media, can provide nonvolatile storage of data, data structures, and computer-executable instructions. The storage 115 or DD 120 can accommodate the storage of any data in a suitable digital format. The storage 115 or DD 120 can include one or more apps that are used to execute aspects of the architecture included in this disclosure.

One or more program modules can be stored in the storage 115 or DD 120, including an operating system, one or more application programs, one or more application program interfaces (APIs), other program modules, and program data. The APIs can include, for example, web APIs, simple object access protocol (SOAP) APIs, remote procedure call (RPC) APIs, representation state transfer (REST) APIs, or other utilities or services APIs. Any of the operating system, application programs, program modules, and program data can be cached in the RAM 115B as executable sections of computer code.

The network interface 125 can be connected to the network 30 (shown in FIG. 1) or the Internet (not shown). The network interface 125 can be connected to one or more computer resource assets in the network 30 (shown in FIG. 1), including, for example, the storage system 10 (shown in FIG. 1), the SD 20 (shown in FIG. 1) or the communicating device 40 (shown in FIG. 1). The network interface 125 can include a wired or a wireless communication network interface (not shown) or a modem (not shown). When used in a LAN, the security appliance 50 can be connected to the LAN through the wired or wireless communication network interface; and, when used in a wide area network (WAN), the security appliance 50 can be connected to the WAN network through the modem. The modem (not shown) can be internal or external and wired or wireless. The modem can be connected to the backbone 180 via, for example, a serial port interface (not shown).

The (I/O) interface 130 can receive commands and data from an operator. The I/O interface 130 can be communicatively coupled to one or more input/output devices (not shown), including, for example, a keyboard (not shown), a mouse (not shown), a pointer (not shown), a microphone (not shown), a speaker (not shown), or a display (not shown). The received commands and data can be forwarded from the I/O interface 130 as instruction and data signals via the backbone 190 to any component in the security appliance 50.

The driver unit 135 can include an audio driver 135A and a video driver 135B. The audio driver 135A can include a sound card, a sound driver (not shown), an interactive voice response (IVR) unit, or any other device necessary to render a sound signal on a sound production device (not shown), such as for example, a speaker (not shown). The video driver 135B can include a video card (not shown), a graphics driver (not shown), a video adaptor (not shown), or any other device necessary to render an image or video signal on a display device (not shown).

Each of the SD configuration unit 140, system complex key generator 150 and release complex key generator 160 can be arranged as a separate computing device (as shown in FIG. 2) or they can be arranged as a single computing device (not shown).

The SD configuration unit 140 can include a computer resource that can be arranged to configure the storage system 10 or SD 20 (shown in FIG. 1). The SD configuration unit 140 can be arranged to configure each SD 20 in the storage system 10. The SD configuration unit 140 can be arranged to configure the storage system 10 with a system complex key (SCK) and a system identification (SID). The SD configuration unit 140 can be arranged to encode or store the SCK and SID (SCK-SID combination) in each SD 20 in the storage system 10 (shown in FIG. 1). The SCK-SID combination can be stored, for example, in the MP 25 (shown in FIG. 4), in each SD 20 in the storage system 10.

The SD configuration unit 140 can be arranged generate to generate the SCK, or it can be arranged to interact with the system complex key generator 150 to generate the SCK for the storage system 10. The SCK can be generated, for example, during initial configuration of the storage system 10. The SCK can later be used to suspend all read and write operations to/from the TSD 20 (shown in FIG. 1), such as, for example, by a storage administrator.

The SD configuration unit 140 can be arranged to determine the SID, or it can be arranged interact with one or more computer resources in the storage system 10 to determine the SID. The SID can include, for example, a serial number, a media access control (MAC) address or any other unique identifier for the storage system 10.

Figure 4:
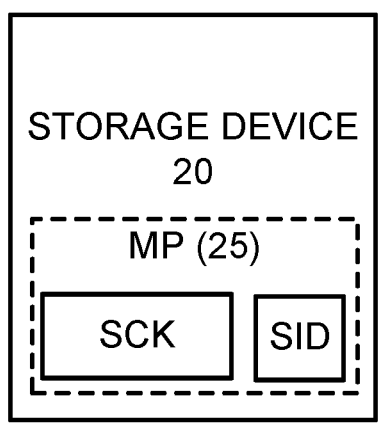
FIG. 4 shows a nonlimiting example of a storage device, constructed according to the principles of the disclosure.

The SD configuration unit 140 can be arranged to interact with each SD 20 in the storage system 10 and encode or store the SCK-SID combination in the SD 20 (shown in FIGS. 1 and 4). The SCK-SID combination can be stored in long-term memory or hardcoded in each SD 20.

The SD configuration unit 140 can be arranged to request or receive a system complex key password (SCKP), for example, via the I/O interface 130. Alternatively, each SD 20 can be arranged to request or receive the SCKP. The SD configuration unit 140 can be arranged to suspend or terminate read and write operations to the TSD 20 (shown in FIG. 1). Alternatively, the TSD 20 can be arranged to suspend or terminate its read and write operations. The SD configuration unit 140 (or TSD 20) can be arranged to redistribute data, or cause data to be redistributed from the TSD 20 to one or more other SDs 20 in the storage system 10. The SD configuration unit 140 can be arranged to automatically format the TSD 20, or the TSD 20 can be arranged to automatically format itself.

The SD configuration unit 140 can be arranged to generate a release complex key (RCK), or the SD configuration unit 140 can be arranged to interact with the release complex key generator 160 to generate the RCK. The RCK can be generated, for example, during initial configuration of the storage system 10 (shown in FIG. 1) and later used to unlock the TSD 20 (shown in FIG. 1) so that it can be removed from the storage system 10.

The system complex key generator 150 and the release complex key generator 160 can each (or both) include a symmetric-key generator, a public-key generator, a random key generator, or any computer resource that can generate a unique sequence of pseudo-random characteristics. The system complex key generator 150 can be arranged to generate the SCK for the storage system 10. The release complex key generator 160 can be arranged to generate the RCK for the storage system 10 (or TSD 20).

The system complex key generator 150 can be arranged to run, for example, a symmetric-key generation algorithm or a public-key generation algorithm to generate the SCK. The release complex key generator 160 can be arranged to run, for example, a symmetric-key generation algorithm or a public-key algorithm to generate the RCK.

The event notification generator 170 can include a computer resource that is arranged to detect or determine a trigger event and generate an event notification based on the trigger event. For instance, the event notification generator 170 can be arranged to detect when an incorrect SCKP or RCKP has been entered more than a permitted maximum number of times, such as, for example, three times, and generate an event notification that indicates that repeated incorrect entries were made. The event notification generator 170 can interact with the network interface 125 or I/O interface 130 to send the event notification to the communicating device 40 (shown in FIG. 1), which may be operated by, for example, a system administrator, a security analyst, a hardware engineer or an SOC member. The event notification can include, for example, an email message, a text message, a graphic user interface (GUI), a voice call or any other technology for communicating an alert to the communicating device 40.

The database 180 can be arranged to store data relating to the storage system 10 (shown in FIG. 1), including each SD 20 in the storage system 10. The database 180 can be arranged to store SCK and SID data for one or more storage systems, including the storage system 10. The database 180 can be arranged to store RCK data for one or more storage systems, including the storage system 10. The database 180 can be arranged to be accessed by any one or more of the components 110 through 170, as well as other computer resources, such as, for example, the communicating device 40 (shown in FIG. 1) or SD 20 (shown in FIGS. 1 and 4). The database 180 can be arranged to receive queries and, in response, retrieve specific records or portions of records based on the queries. The database 180 can include a database management system (DBMS) that can interact with one or more of the components 110 through 170. The DBMS can be arranged to interact with computer resources outside of the security appliance 50, such as, for example, the communicating device 40 (shown in FIG. 1) or the SD 20 (shown in FIGS. 1 and 4). The database 180 can include a DBMS such as, for example, SQL, MySQL, Oracle, Access, or Unix. The database 180 can include a relational database. The database 180 can include the computing resource base for the entire user environment 1 (shown in FIG. 1).

Figure 3:
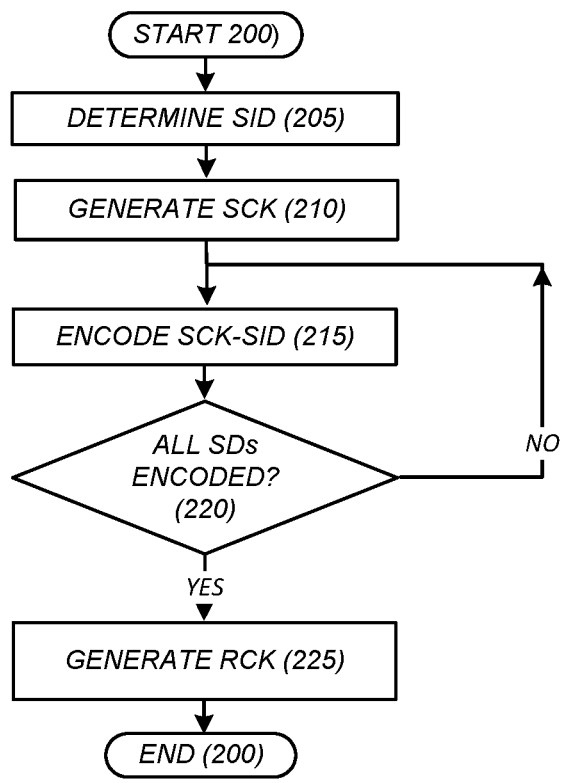
FIG. 3 shows a nonlimiting example of a storage system configuration process, according to the principles of the disclosure.

FIG. 3 shows a nonlimiting embodiment of a storage system configuration process 200 that can be implemented during initial setup and configuration of one or more storage systems in the user environment 1 (shown in FIG. 1). The process 200 can be carried out, by for example, the security appliance 50 (shown in FIG. 1 or 2) to configure a new storage system, such as, for example, during initial installation and setup of the storage system 10 (shown in FIG. 1). Initially, a SID can be determined for a new storage system (Step 205). The SID can include, for example, a system serial number for the storage system 10 (shown in FIG. 1). The storage system can include, for example, the storage system 10 during its initial installation or configuration in the user environment 1 (shown in FIG. 1). The SID can be determined by, for example, the SD configuration unit 140 (shown in FIG. 2).

An SCK can be generated for the overall storage system 10 (Step 210). The SCK can be generated, for example, by the system complex key generator 150 (shown in FIG. 2). The SCK and SID (SCK-SID combination) can be encoded or stored in each SD 20 (shown in FIG. 1) in the storage system 10. The SCK-SID combination can be stored or hardcoded in each SD 20. The SCK can later be used to suspend all read and write operations to\from an SD 20 (for example, TSD 20, shown in FIG. 1).

A determination can be made whether all SDs 20 in the storage system 10 have been encoded with the SCK-SID combination for the storage system 10 (Step 220). If it is determined that an SD 20 has not been encoded (NO at Step 220), then the unencoded SD 20 can be encoded with the SCK-SID combination (Step 215), otherwise (YES at Step 220) an RCK can be generated (Step 225). The RCK can be generated, for example, by the release complex key generator 160 (shown in FIG. 2). The RCK can be used later to unlock the TSD 20 from the storage system 10 (shown in FIG. 1).

FIG. 4 shows a nonlimiting example of an SD 20 provided with the MP 25. The SCK-SID combination can be stored or encoded in the MP 25.

Figure 5:
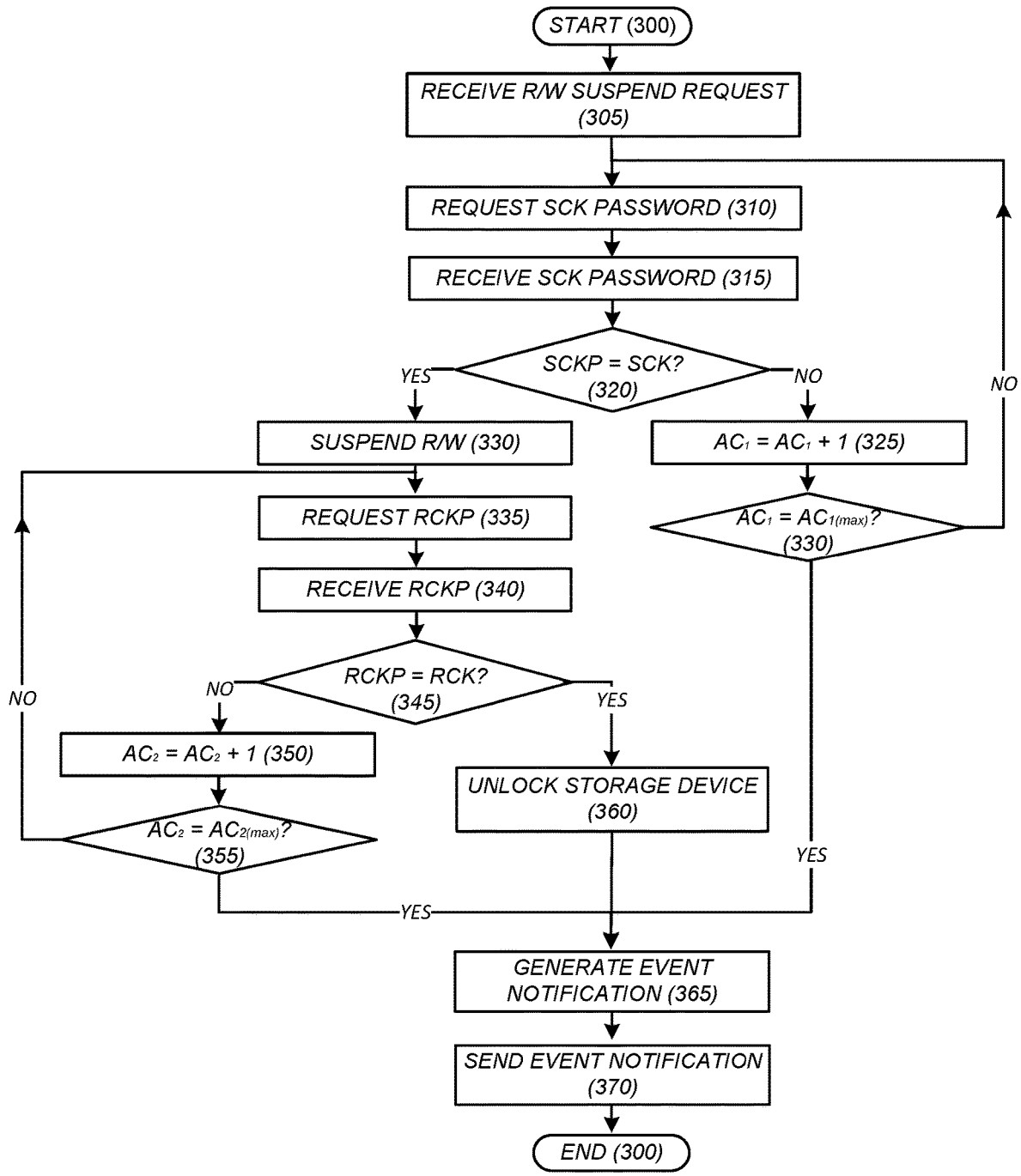
FIG. 5 shows a nonlimiting embodiment of a storage device removal process, according to the principles of the disclosure.

FIG. 5 shows a nonlimiting embodiment of a storage device removal process 300, according to the principles of the disclosure. The process 300 can be carried out, for example, by the security appliance 50 (shown in FIG. 1 or 2) or the TSD 20 (shown in FIG. 1).

Referring to FIGS. 1 and 5, to safely remove the TSD 20 from the storage system 10 without data corruption or application interruption, a request can be received (for example, by the SA 50, shown in FIGS. 1 and 2) to suspend or terminate read and write operations to the TSD 20 (Step 305). For instance, a storage administrator can execute a command to suspend read and write operations to the TSD 20 as a pre-step to removing the TSD 20 from the storage system 10. The command can be executed directly, for example, via the I/O interface 130 in the security appliance 50 (shown in FIG. 2). The command can be executed, for example, via the communicating device 40 and received by the security appliance 50 or TSD 20 (shown in FIG. 1).

A request for an SCK password (SCKP) can be generated (Step 310). In a nonlimiting embodiment, the SCKP request can be rendered as a message on a display device (not shown) or sent to a communicating device (for example, communicating device 40, shown in FIG. 1), asking for the SCKP to be entered. The SCKP can be entered automatically or, for example, by a user (such as, for example, a storage administrator or hardware engineer) using a user interface device (not shown) such as, for example, a keyboard or keypad. The SCKP can be received (Step 315) and compared to the SCK stored in the TSD 20 (Step 320). If the received SCKP matches the SCK (YES at Step 320), then read and write operations can be suspended or terminated to the TSD 20 (Step 330).

However, if the received SCKP does not match the stored SCK (NO at Step 320), then a failed attempt counter for the SCK ($AC_1$) can be incremented by one—that is, $AC_1=AC_1+1$ (Step 325). The initial value for the failed attempt counter for the SCK ($AC_1$) can be set to zero. A determination can be made whether the failed attempt counter $AC_1$ has reached a maximum counter value $AC_{1(max)}$ (Step 330). If it is determined that the failed attempt counter $AC_1$ is less than the maximum counter value $AC_{1(max)}$ ($AC_1<AC_1$ (max)) (NO at Step 330), then a new SCKP can be requested (Step 310), otherwise (YES at Step 330) a triggering event can be determined and an event notification can be generated (Step 365), which can be sent, for example, to the communicating device 40 (shown in FIG. 1) (Step 370). For example, where the maximum value $AC_{1(max)}$ is set to three (3), if it is determined that an incorrect SCKP has been received three consecutive times (YES at Step 330), then an event notification can be generated (Step 365), such as, for example, a text message, an email message, or a phone call, and the event notification can be transmitted to the communicating device 40 (Step 370), which can be monitored by a datacenter security guard, storage, administrator, or any other person or computer resource tasked with executing remedial action in response to the event notification.

After the read/write operations are suspended for the TSD 20 (in Step 330), a release complex key password (RCKP) can be requested (Step 335) and received (Step 340). In alternative embodiments, the RCKP can be requested before read/write operations are suspended or while the read/write operations are in the process of being suspended. The received RCKP can be compared to the stored RCK (Step 345) and, if a match is determined (YES at Step 345), the TSD 20 can be unlocked (Step 360) to allow for removal from the storage system 10. The unlocking and removal of the TSD 20 can be determined to be a triggering event and an event notification can be generated (Step 365) and transmitted, for example, to the communicating device 40 (shown in FIG. 1) (Step 370), thereby, for example, notifying a storage team or storage administrator that the TSD 20 was removed successfully.

If, however, the received RCKP is determined not to match the stored RCK (NO at Step 345), then a failed attempt counter for the RCKP ($AC_2$) can be incremented by one—that is, $AC_2=AC_2+1$ (Step 350). The initial value for the failed attempt counter for the RCKP ($AC_2$) can be set to zero. A determination can be made whether the failed attempt counter $AC_2$ has reached a maximum counter value $AC_{2(max)}$ (Step 355). If it is determined that the failed attempt counter $AC_2$ is less than the maximum counter value $AC_{2(max)}$ ($AC_2<AC_{2(max)}$) (NO at Step 355), then a new RCKP can be requested (Step 335), otherwise (YES at Step 355) a triggering event can be determined and an event notification can be generated (Step 365) and sent to, for example, the communicating device 40 (shown in FIG. 1) (Step 370). For example, where the maximum value $AC_{2(max)}$ is set to three (3), if it is determined that an incorrect RCKP has been received three consecutive times (YES at Step 355), then an event notification can be generated (Step 365) and sent to the communicating device 40 (Step 370).

If both the correct SCKP and RCKP are received for the TSD 20 (YES at Step 320 and YES at Step 345), then the TSD 20 can be unlocked for removal from the storage system 10 (Step 360), without any data corruption or interruption to storage applications. Also, a storage administrator, storage team, monitoring team, or any other individual or communicating device can be notified, for example, through e-mail or automated phone call, that the TSD 20 was removed successfully (Steps 365 and 370).

Figure 6:
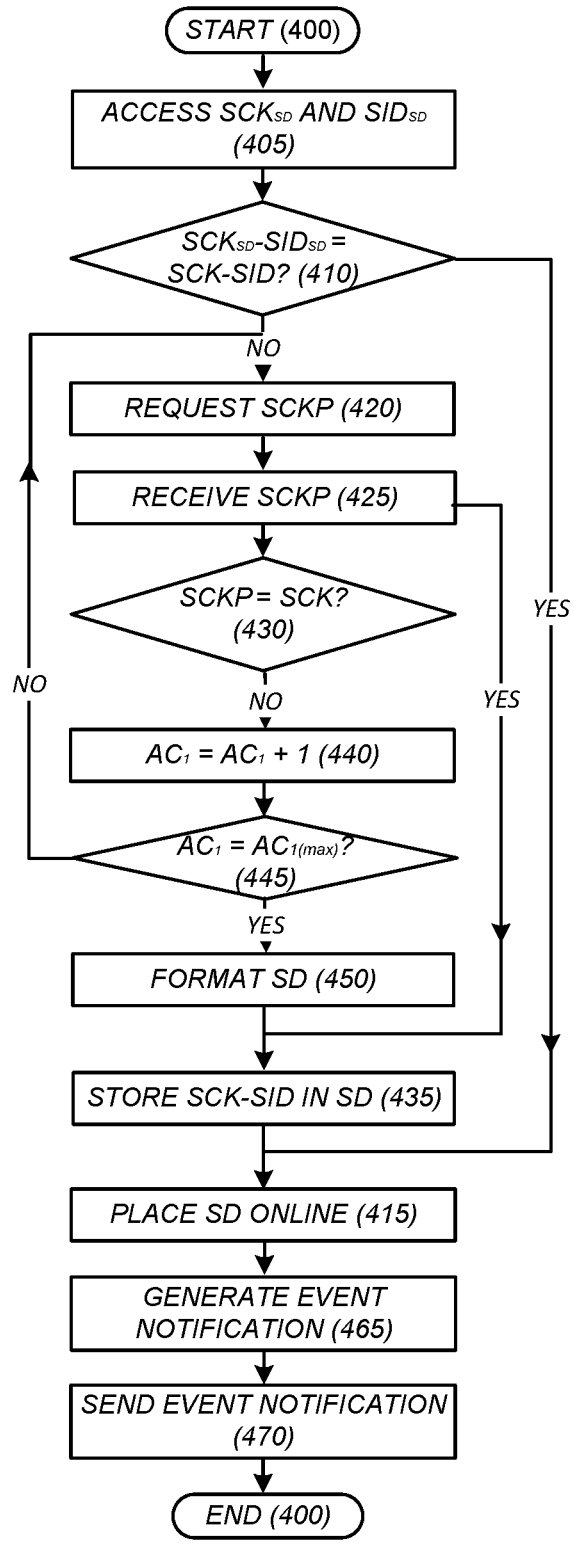
FIG. 6 shows a nonlimiting embodiment of a storage device installation process, according to the principles of the disclosure.

FIG. 6 shows a nonlimiting embodiment of a storage device installation process 400, according to the principles of the disclosure. The process 400 can be carried out, for example, by the security appliance 50 (shown in FIG. 1 or 2) or by the TSD 20 (shown in FIG. 1) for safe installation of the TSD 20 into the storage system 10, without losing or corrupting data hosted in the TSD 20, which can include, for example, critical or confidential data.

Referring to FIGS. 1 and 6, after the TSD 20 is installed into slot 5 and connectivity established between the TSD 20 and storage system 10, the $SCK_{SD}$ and $SID_{SD}$ that are kept in the TSD 20 can be accessed (Step 405) and compared against the SCK and SID for the storage system 10 (Step 410). If both $SCK_{SD}$ and $SID_{SD}$ in the TSD 20 are determined to match both SCK and SID, respectively, in the storage system 10 (YES at Step 410), then the TSD 20 can be placed online and its contents made accessible (Step 415). Placement of the TSD 20 online (Step 415) can be determined to be a triggering event and an event notification can be generated (Step 465) and sent (Step 470), for example, to the communicating device 40 (shown in FIG. 1). The event notification can include, for example, a text message, an email message, or a phone call that can be sent to the communicating device 40, informing the user that the TSD 20 is online and accessible.

If, however, either or both $SCK_{SD}$ and $SID_{SD}$ in the TSD 20 are determined not to match the SCK and/or SID in the storage system 10 (NO at Step 410), then a request can be generated that requires provisioning of a new SCKP that matches the stored SCK for the storage system 10 (Step 420) and a new SCKP can be received (Step 425). A determination can be made whether the new SCKP matches the SCK for the storage system 10 (Step 430). If it is determined that the new SCKP matches the SCK (YES at Step 430), then the SCK-SID combination for the storage system 10 can be encoded (or updated) in the TSD 20 (Step 435) and the TSD 20 placed online (Step 415), thereby making its contents accessible in the storage system 10. Placement of the TSD 20 online can be determined to be a triggering event and an event notification can be generated (Step 465) and sent (Step 470), for example, to the communicating device 40 (shown in FIG. 1), informing the user that the TSD 20 is online and accessible.

However, if the received SCKP does not match the stored SCK (NO at Step 430), then the failed attempt counter for the SCK ($AC_1$) can be incremented by one—that is, $AC_1=AC_1+1$ (Step 440)—and a determination can be made whether the failed attempt counter $AC_1$ has reached the maximum counter value $AC_{1(max)}$ (Step 445). If it is determined that the failed attempt counter $AC_1$ is less than the maximum counter value $AC_{1(max)}$ ($AC_1<AC_{1(max)}$) (NO at Step 445), then a new SCKP can be requested (Step 420), otherwise (YES at Step 445) the TSD 20 can be formatted (Step 450) and the SCK-SID combination for the storage system 10 encoded or stored into the formatted TSD 20 (Step 435). The formatted TSD 20 can then be placed online as a new SD 20 (Step 415). The formatting and/or placement of the TSD 20 online can be a triggering event and an event notification can be generated (Step 465) and sent (Step 470), for example, to the communicating device 40 (shown in FIG. 1).

The terms "a," "an," and "the," as used in this disclosure, means "one or more," unless expressly specified otherwise.

The term "backbone," as used in this disclosure, means a transmission medium or infrastructure that interconnects one or more computing devices or communication devices to provide a path that conveys data packets and instruction signals between the one or more computing devices or communication devices. The backbone can include a bus or a network. The backbone can include an ethernet TCP/IP. The backbone can include a distributed backbone, a collapsed backbone, a parallel backbone or a serial backbone.

The term "communicating device," as used in this disclosure, means any computing device, hardware, firmware, or software that can transmit or receive data packets, instruction signals or data signals over a communication link. The communication device can be portable or stationary.

The term "communication link," as used in this disclosure, means a wired or wireless medium that conveys data or information between at least two points. The wired or wireless medium can include, for example, a metallic conductor link, a radio frequency (RF) communication link, an Infrared (IR) communication link, or an optical communication link. The RF communication link can include, for example, WiFi, WiMAX, IEEE 802.11, DECT, 0G, 1G, 2G, 3G, 4G or 5G cellular standards, or Bluetooth. A communication link can include, for example, an RS-232, RS-422, RS-485, or any other suitable interface.

The terms "computer" or "computing device," as used in this disclosure, means any machine, device, circuit, component, or module, or any system of machines, devices, circuits, components, or modules that are capable of manipulating data according to one or more instructions. The terms "computer" or "computing device" include, for example, without limitation, a processor, a microprocessor (µC), a central processing unit (CPU), a graphic processing unit (GPU), an application specific integrated circuit (ASIC), a general purpose computer, a super computer, a personal computer, a laptop computer, a palmtop computer, a notebook computer, a desktop computer, a workstation computer, a server, a server farm, a computer cloud, or an array or system of processors, µCs, CPUs, GPUs, ASICs, general purpose computers, super computers, personal computers, laptop computers, palmtop computers, notebook computers, desktop computers, workstation computers, or servers.

The term "computer resource," as used in this disclosure, means a computing device, a communication device, software, software application, machine learning platform, web application, computer application, computer program, computer code, machine executable instructions, or firmware.

The term "computer-readable medium," as used in this disclosure, means any storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random-access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "cloud," which can include a distribution of files across multiple (e.g., thousands of) memory caches on multiple (e.g., thousands of) computers.

Various forms of computer readable media can be involved in carrying sequences of instructions to a computer. For example, sequences of instruction (i) can be delivered from a RAM to a processor, (ii) can be carried over a wireless transmission medium, or (iii) can be formatted according to numerous formats, standards or protocols, including, for example, WiFi, WiMAX, IEEE 802.11, DECT, 0G, 1G, 2G, 3G, 4G, or 5G cellular standards, or Bluetooth.

The term "database," as used in this disclosure, means any combination of software and/or hardware, including at least one application and/or at least one computer. The database can include a structured collection of records or data organized according to a database model, such as, for example, but not limited to at least one of a relational model, a hierarchical model, or a network model. The database can include a database management system application (DBMS). The at least one application may include, but is not limited to, for example, an application program that can accept connections to service requests from clients by sending back responses to the clients. The database can be configured to run the at least one application, often under heavy workloads, unattended, for extended periods of time with minimal human direction.

The terms "including," "comprising" and variations thereof, as used in this disclosure, mean "including, but not limited to," unless expressly specified otherwise.

The term "network," as used in this disclosure means, but is not limited to, for example, at least one of a personal area network (PAN), a local area network (LAN), a wireless local area network (WLAN), a campus area network (CAN), a metropolitan area network (MAN), a wide area network (WAN), a metropolitan area network (MAN), a wide area network (WAN), a global area network (GAN), a broadband area network (BAN), a cellular network, a storage-area network (SAN), a system-area network, a passive optical local area network (POLAN), an enterprise private network (EPN), a virtual private network (VPN), the Internet, or the like, or any combination of the foregoing, any of which can be configured to communicate data via a wireless and/or a wired communication medium. These networks can run a variety of protocols, including, but not limited to, for example, Ethernet, IP, IPX, TCP, UDP, SPX, IP, IRC, HTTP, FTP, Telnet, SMTP, DNS, ARP, ICMP.

The term "server," as used in this disclosure, means any combination of software and/or hardware, including at least one application and/or at least one computer to perform services for connected clients as part of a client-server architecture. The at least one server application can include, but is not limited to, for example, an application program that can accept connections to service requests from clients by sending back responses to the clients. The server can be configured to run the at least one application, often under heavy workloads, unattended, for extended periods of time with minimal human direction. The server can include a plurality of computers configured, with the at least one application being divided among the computers depending upon the workload. For example, under light loading, the at least one application can run on a single computer. However, under heavy loading, multiple computers can be required to run the at least one application. The server, or any if its computers, can also be used as a workstation.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described herein may be performed in any order practical.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. An automated method for protecting contents of a target storage device that is removable from a storage system having a unique system identification (SID), the method comprising:
   generating a system complex key (SCK) and a release complex key (RCK) using the SID;
   receiving a request to remove the target storage device from the storage system, the storage system comprising a plurality of storage devices each storing the generated SCK and the SID;
   challenging the request by requesting input of the generated SCK;
   receiving a system complex key password (SCKP) in response to the challenge;
   determining whether the received SCKP matches the generated SCK;
   suspending all read or write operations to the target storage device in response to determining the received SCKP matches the generated SCK;
   challenging the request after suspending all read or write operations to the target storage device by requesting input of the generated RCK;
   receiving a release complex key password (RCKP) in response to the second challenge;
   determining whether the received RCKP matches the generated RCK; and
   unlocking the target storage device for safe removal from the storage system in response to determining the received RCKP matches the generated RCK.

2. The method in claim 1, further comprising:
   redistributing data from the target storage device to one or more of the plurality of storage devices.

3. The method in claim 1, further comprising:
   detecting a triggering event related to the target storage device.

4. The method in claim 3, further comprising:
   generating an event notification based on the triggering event.

5. The method in claim 4, further comprising:
   sending the generated event notification to a communicating device located in a security operations center (SOC) or a storage administrator site.

6. The method in claim 1, further comprising:
   maintaining all read or write operations to the target storage device in response to determining the received SCKP does not match the generated SCK.

7. The method in claim 1, further comprising:
   receiving a storage device in the storage system;
   establishing connectivity between the received storage device and the storage system;
   accessing a system complex key ($SCK_{SD}$) and system identification ($SID_{SD}$) combination contained in the received storage device;
   comparing the accessed $SCK_{SD}$ and $SID_{SD}$ combination to the combination of SCK and SID for the storage system;
   challenging the receiving of the storage device in response to the $SCK_{SD}$ and $SID_{SD}$ combination not matching the combination of SCK and SID for the storage system by requesting input of the generated SCK;
   receiving a second SCK password (second SCKP) in response to the third challenge;
   determining whether the received second SCKP matches the generated SCK; and
   determining whether to format the received storage device or place the received storage device online based on the comparison or the second SCKP determination.

8. The method in claim 7, further comprising:
   placing the received storage device online when the accessed $SCK_{SD}$ and $SID_{SD}$ combination matches the combination of SCK and SID for the storage system.

9. The method in claim 7, further comprising:
   formatting the received storage device in response to determining the received second SCKP does not match the generated SCK.

10. An automated system for protecting contents of a target storage device that is removable from a storage system having a unique system identification (SID), the system comprising:
    a security appliance that is arranged to:
       generate a system complex key (SCK) and a release complex key (RCK) using the SID;
       receive a request to remove the target storage device from the storage system, the storage system comprising a plurality of storage devices each storing the generated SCK and the SID;
       challenge the request by requesting input of the generated SCK;
       receive a system complex key password (SCKP) in response to the challenge;
       determine whether the received SCKP matches the generated SCK; and suspend all read or write operations to the target storage device in response to determining the received SCKP matches the generated SCK;
challenge the request after suspending all read or write operations to the target storage device by requesting input of the generated RCK;
receive a release complex key password (RCKP) in response to the second challenge;
determine whether the received RCKP matches the generated RCK; and
unlock the target storage device for safe removal from the storage system in response to determining the received RCKP matches the generated RCK.

11. The system in claim 10, further comprising:
a system complex key generator arranged to generate the SCK.

12. The system in claim 10, further comprising:
a release complex key generator arranged to generate the RCK.

13. The system in claim 10, wherein the security appliance comprises a storage device configuration unit arranged to redistribute data from the target storage device to one or more of the plurality of storage devices in the storage system.

14. The system in claim 10, wherein the security appliance comprises an event notification generator that is arranged to detect a triggering event related to the target storage device.

15. The system in claim 14, wherein the event notification generator is arranged to generate an event notification based on the triggering event.

16. The system in claim 10, wherein the security appliance is further arranged to maintain all read or write operations to the target storage device in response to determining the received SCKP does not match the generated SCK.

17. The system in claim 10, wherein the security appliance is included in the storage system, and the storage system is arranged to:
receive a storage device;
establish connectivity with the received storage device;
access a system complex key ($SCK_{SD}$) and system identification ($SID_{SD}$) combination contained in the received storage device;
compare the accessed $SCK_{SD}$ and $SID_{SD}$ combination to the combination of SCK and SID for the storage system;
challenge the receiving of the storage device in response to the $SCK_{SD}$ and $SID_{SD}$ combination not matching the combination of SCK and SID for the storage system by requesting input of the generated SCK;
receive a second SCK password (second SCKP) in response to the third challenge;
determine whether the received second SCKP matches the generated SCK; and
determine whether to format the received storage device or place the received storage device online based on the comparison or the second SCKP determination.

18. A non-transitory computer readable storage medium storing computer program instructions that, when executed by a security appliance, protect a target storage device that is removable from a storage system having a unique system identification (SID), the computer program instructions comprising the steps of:
generating a system complex key (SCK) and a release complex key (RCK) using the SID;
receiving a request to remove the target storage device from the storage system, the storage system comprising a plurality of storage devices each storing the generated SCK and the SID;
challenging the request by requesting input of the generated SCK;
receiving a system complex key password (SCKP) in response to the challenge;
determining whether the received SCKP matches the generated SCK; and
suspending all read or write operations to the target storage device in response to determining the received SCKP matches the generated SCK;
challenging the request after suspending all read or write operations to the target storage device by requesting input of the generated RCK;
receiving a release complex key password (RCKP) in response to the second challenge;
determining whether the received RCKP matches the generated RCK; and
unlocking the target storage device for safe removal from the storage system in response to determining the received RCKP matches the generated RCK.

19. The storage medium in claim 18, wherein the computer program instructions comprise a further step of:
redistributing data from the target storage device to one or more of the plurality of storage devices.

20. The storage medium in claim 18, wherein the computer program instructions comprise further steps of:
detecting a triggering event related to the target storage device;
generating an event notification based on the triggering event; and
sending the generated event notification to a communicating device located in a security operations center (SOC) or a storage administrator site.

21. The storage medium in claim 18, wherein the computer program instructions comprise a further step of:
maintaining all read or write operations to the target storage device in response to determining the received SCKP does not match the generated SCK.

22. The storage medium in claim 18, wherein the computer program instructions comprise further steps of:
receiving a storage device in the storage system;
establishing connectivity between the received storage device and the storage system;
accessing a system complex key ($SCK_{SD}$) and system identification ($SID_{SD}$) combination contained in the received storage device;
comparing the accessed $SCK_{SD}$ and $SID_{SD}$ combination to the combination of SCK and SID for the storage system;
challenging the receiving of the storage device in response to the $SCK_{SD}$ and $SID_{SD}$ combination not matching the combination of SCK and SID for the storage system by requesting input of the generated SCK;
receiving a second SCK password (second SCKP) in response to the third challenge;
determining whether the received second SCKP matches the generated SCK; and
determining whether to format the received storage device or place the received storage device online based on the comparison or the second SCKP determination.

23. The storage medium in claim 22, wherein the computer program instructions comprise a further step of:

placing the received storage device online when the accessed $SCK_{SD}$ and $SID_{SD}$ combination matches the combination of SCK and SID for the storage system.

\* \* \* \* \*